May 17, 1938.   L. H. STRAYER   2,117,376
ALIGNING DEVICE
Filed Oct. 6, 1936

INVENTOR.
LAWRENCE H. STRAYER
BY
Kwis, Hudson & Kent
ATTORNEYS

Patented May 17, 1938

2,117,376

UNITED STATES PATENT OFFICE 2,117,376

ALIGNING DEVICE

Lawrence H. Strayer, Kent, Ohio, assignor to The Lamson & Sessions Company, Cleveland, Ohio, a corporation of Ohio Application October 6, 1936, Serial No. 104,252

8 Claims. (Cl. 77—5)

This invention relates to a device for arranging or aligning articles to be fed to a work station and, as its principal object, aims to provide an improved device of this kind which, although of very simple construction, is efficient and reliable in operation.

Another object of this invention is to provide an improved device for arranging articles to be fed to a work station, such as hexagonal articles having a previously formed hole therein and in which a second hole is to be formed in a desired angular relation to the first hole.

Still another object of my invention is to provide an improved device, of the type mentioned, comprising a guideway along which the articles are movable and means associated with the guideway for imparting rotation to all of the articles having a certain characteristic.

A further object of my invention is to provide an improved device, of the type referred to, having a guideway along which the articles are movable and also having fingers at opposite sides of the guideway for engagement with the articles, one of the fingers being adapted to engage and partially rotate all articles having a certain characteristic but yielding to permit passage of other articles without rotation and the other finger being adapted to impart rotation to each article.

Other objects and advantages of the invention will be apparent from the following description when taken in conjunction with the accompanying sheet of drawings in which Fig. 1 is a top plan view of an aligning device embodying my invention.

More detailed reference will presently be made to the accompanying drawing, wherein I have illustrated one form of my improved article arranging or aligning device. My improved device is especially useful in handling bolts or other polygonal shaped articles having a hole therein and in which a second hole is to be formed in a desired angular relation to the first hole. I have therefore illustrated the device of my invention as applied to the handling of bolts, but it will be understood of course that the invention may be embodied in various other devices and arrangements and may be applied to the handling of various other articles.

Figure 1:
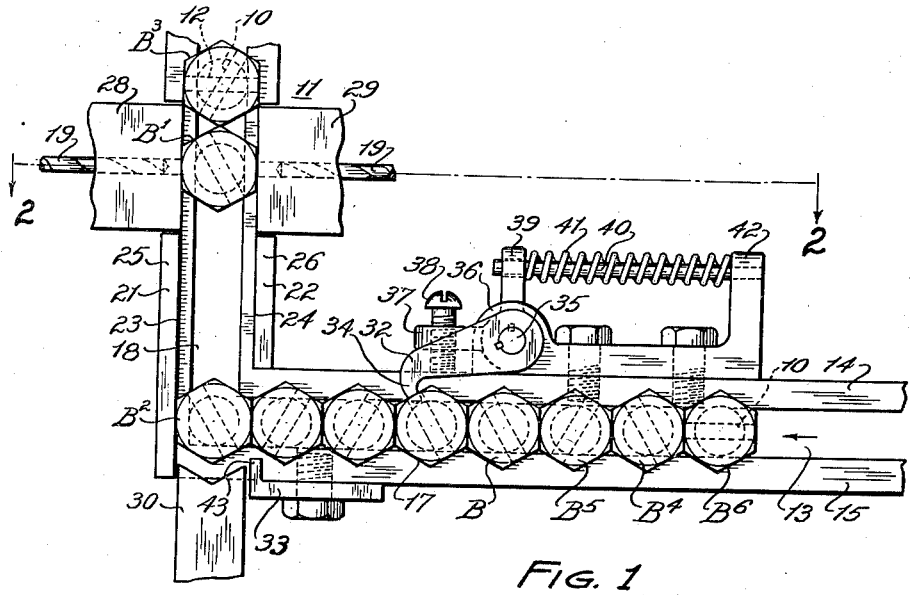
Figure 2:
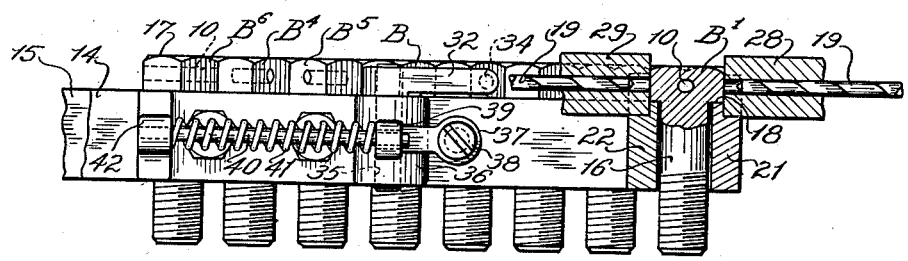
Fig. 2 is a sectional elevation of the device taken as indicated by line 2—2 of Fig. 1.
Figure 4:
Fig. 4 is an end view of the article.
Figure 3:
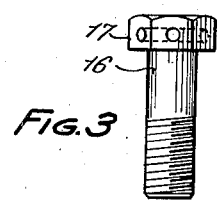
Fig. 3 is a side elevation illustrating one form of article on which my device is adapted to operate.

In Figs. 1 and 2 of the drawing I show my improved aligning device as being used in the handling of bolts B, in this instance hexagonal headed bolts, in which one hole 10 has already been drilled or otherwise formed, and which are to be fed to a work station 11, in this instance, a drilling station where a second hole 12 is to be formed in the bolt at a desired angular relation to the first hole. My aligning device may comprise, in part, a magazine or galley 13 to which the bolts are supplied from a hopper or directly from the first drilling operation. The magazine may be formed by a pair of bars 14 and 15 spaced apart so that the stems 16 of the bolts are freely movable in the guideway therebetween while the heads 17 rest upon the tops of the bars. The bolts B move along the magazine toward the guideway 18, either as the result of the feeding of bolts to the outer end of the magazine, or in response to the action of some suitable advancing or pushing means.

The lower end of the magazine 13 communicates with a guideway 18 which leads to the drilling station 11. As shown in Fig. 1 this guideway extends between the adjacent ends of a pair of aligned drills 19 and substantially at right angles to the drilling axis. The magazine 13 preferably extends at substantially right angles to the guideway 18 and communicates with the latter at a short distance from the drilling station. The guideway 18 may be formed by a pair of bars 21 and 22, which are spaced apart so that the stems of the bolts may be freely suspended therebetween with the heads of the bolts resting upon the edge portions 23 and 24 of the bars. Outwardly of the portions 23 and 24 the bars 21 and 22 are preferably provided with upstanding flange portions 25 and 26, which are spaced apart a distance only slightly larger than the distance across a pair of opposed flats of the hexagonal shaped bolt heads. The upstanding flanges 25 and 26 form a channel along which the bolt heads are movable and prevent rotation of the bolts as they are being moved along in this channel.

The drills 19 may be operated by any suitable apparatus and may be disposed in openings of a pair of laterally spaced blocks 28 and 29 between which the guideway 18 extends. In Fig. 1 of the drawing I show a bolt blank $B^1$ in position for drilling between the blocks 28 and 29. The bolts may be advanced or fed from the lower end of the magazine 13 to the drilling station by a suitable plunger or pusher 30, which may be driven by any suitable means operating in timed relation to the mechanism which operates the drills 19. On each forward stroke of the pusher 30 a bolt is advanced along the guideway 18 from the position of the bolt $B^2$ to the position of the bolt $B^1$. As each bolt is thus advanced to the drilling station the previously advanced bolt is pushed out of the drilling station by the bolt being advanced. In Fig. 1 the bolt $B^3$ has had the second opening 12 drilled therein and has just been pushed out of the drilling station by the bolt $B^1$ which is to be drilled next. The pusher 30 is shown in its retracted position and in readiness to advance the bolt $B^2$ to the drilling station.

Since the bolts which are supplied to the magazine 13 have already had one opening 10 formed therein it is important that they be aligned or prearranged before feeding to the drilling station 11 in order that another pair of faces of the bolt head be presented to the drills 19. If this were not done some of the bolts would be fed to the drilling station with the first hole 10 extending parallel with the drills and the desired second hole would not be formed in the bolt head. My aligning device is therefore provided to prearrange the bolts so that undrilled faces will be presented to the drills 19 when the bolts are advanced to the drilling station.

This aligning means may be associated with the magazine 13, as illustrated in this instance, and may comprise a finger-like member 32 at one side of the magazine adapted to impart rotation to certain of the bolts and a finger-like member 33 at the opposite side of the magazine adapted to impart rotation to each of the bolts. The finger 32 is provided with a hook-like contact portion 34 and is arranged to overlie one of the bars of the magazine, for example the bar 14, so that such hook-like portion will contact the head of each bolt. The finger 32 may be carried by a pivot pin 35 which is rotatable in a suitable bearing 36. A bell crank lever also mounted on the shaft 35 may have one arm 37 thereof provided with an adjustable stop in the form of the screw 38 and its other arm 39 provided with an opening in which a guide rod 40 is freely slidable. A compression spring 41, surrounding the guide rod 40 and disposed between the lever arm 39 and the lug 42, acts on the bell crank lever to yieldingly press the contact portion 34 of the finger 32 against the bolt heads.

As the bolts B move downwardly in the magazine 13, the previously formed opening 10 may be in any one of three positions with respect to the direction of travel, these three positions being represented, respectively, by the bolts $B^4$, $B^5$, and $B^6$. When one of the bolts $B^4$ passes under the finger 32 the contact portion 34 engages in the hole 10 and causes the bolt to be rotated, through an angular distance of approximately 60° in the case of the hexagon headed bolts here illustrated, or in other words, rotated in a clockwise direction to the position of the bolts $B^5$. When bolts in the position of the bolts $B^5$ pass under the finger 32 the contact portion 34 slides over the inclined face of the bolt head without imparting rotation to the bolt. The spring 41 permits the finger to yield or rock during such travel of the bolt head under the contact portion 34. Similarly when a bolt in the position of the bolt $B^6$ passes under the finger 32 the contact portion 34 slides on the bolt face and rides over the adjacent corner without imparting rotation to the bolt. The result of this functioning is that bolts which travel down the magazine in the position of the bolts $B^4$ are rotated by the finger 32 while all of the other bolts pass the finger without being rotated.

After passing the finger 32 each of the bolts engages the finger-like member 33 which is rigidly mounted on the bar 15 of the magazine so that the contact portion 43 extends into the path of movement and is engaged by the bolt heads in succession. Since the finger 33 is rigidly mounted it will cause counter-clockwise rotation to be imparted to each bolt head passing the finger. The result of the functioning of the finger 33 is that a bolt arriving at this finger in the position of the bolt $B^5$ is rotated to the position of the bolt $B^4$ and a bolt arriving at this finger in the position of the bolt $B^6$ is rotated to the position of the bolt $B^5$. In this way I find that as the result of the action of the fingers 32 and 33 no bolt will arrive at the latter finger with its opening in the position represented by the bolt $B^5$ and no bolt will enter the guideway 18 from the magazine 13 with the opening 10 extending parallel to the direction of the drills 10. Hence a pair of undrilled flats will be presented to the drills 19 by each bolt fed to the drilling station.

In describing my improved aligning device and its operation I have referred to the holes 10 and 12 as being formed in bolt heads, but it should be understood that substantially this same device may be used for arranging or aligning bolts for the drilling of similar holes through the bolt stem. It will also be understood, that although in describing the construction and operation of my aligning device I have referred to bolts, the invention may be used for aligning or prearranging various other articles with little or no changing of the apparatus disclosed.

From the foregoing description and the accompanying drawing it will now be readily understood that I have provided a simple and efficient device for aligning or prearranging bolts, or other articles, so that an operation to be performed thereon will be carried out in definite relation to a certain characteristic of the article. It will also be seen that imparting rotation in one direction to certain of the articles and subsequently imparting rotation in the opposite direction to all of the articles, results in the articles arriving at the work station in proper position for the performance of the desired operation thereon. Furthermore, it will be readily seen that by providing the article feeding magazine with a pair of finger-like members one of which is yieldable, the desired aligning or prearranging of the articles can be readily obtained.

While I have illustrated and described the aligning device of my invention in a somewhat detailed manner, it should be understood that I do not wish to be limited to the precise details of constructions and arrangements of parts disclosed, but regard my invention as including such changes and modifications as do not constitute a departure from the spirit of the invention and the scope of the appended claims.

Having thus described my invention, I claim:

1. In a device of the character described having a drilling station, means providing a guideway along which articles are movable to said drilling station, and means for arranging the articles during feeding thereof so that each will arrive at the drilling station in a desired relative position, said arranging means comprising a means associated with the guideway for engaging individual articles in succession and adapted to cause partial rotation of all articles having a certain characteristic but permitting passage of the other articles without imparting rotation thereto and other means associated with the guideway and adapted to engage and partially rotate each article.

2. In a device for feeding bolt blanks or the like, a work station, guide means along which the blanks are movable to said work station, and means for arranging the articles during feeding thereof so that each will arrive at the work station in a desired relative position, said arranging means comprising a means disposed to engage and partially rotate each blank occupying a given relative position but being yieldable to permit passage of the other blanks without rotation and other means disposed to subsequently engage and partially rotate each blank.

3. In a device of the character described the combination of a work station, guide means along which articles are movable to said work station, and means for arranging the articles during feeding thereof so that each will arrive at the work station in a desired relative position, said arranging means comprising a means extending inwardly at one side of the guide means and adapted to engage the articles in succession and to impart rotation to certain of the articles, and means extending inwardly from the other side of the guide means and adapted to impart rotation to each article.

4. In apparatus for aligning articles for drilling or the like, a guideway along which articles having a previously formed hole are movable, and means providing a finger adapted to engage in the hole of said articles, said finger being disposed relative to the guideway to contact each article and to impart rotation to those articles which are in position to present the hole thereof for engagement of said finger therein.

5. In apparatus for aligning articles for drilling or the like, a drilling station, a guideway along which articles having a previously formed hole are movable to said station, and means for arranging the articles during feeding thereof so that each will arrive at the station in a desired relative position, said arranging means comprising a yieldable finger adapted to contact each article and to impart rotation to those articles which present the hole for engagement of the finger therein but yielding to permit passage of the other articles without imparting rotation thereto and means arranged to subsequently engage and impart rotation to each article.

6. In apparatus for drilling articles of polygonal shape to provide a hole therein in predetermined relation to an existing hole, a drilling station, a magazine containing a supply of the articles, means for delivering articles from the magazine to said drilling station, and means associated with the magazine for prearranging the articles during delivery thereof so that each article will arrive at the drilling station in a desired relative position comprising a yieldable finger adapted to rotate certain of the articles through a predetermined angular distance in one direction and another finger adapted to rotate each of the articles through a similar angular distance in the opposite direction.

7. In apparatus for drilling hexagon-shaped articles to provide a hole across a pair of flats in angular relation to an existing hole across another pair of flats, a magazine containing a supply of the articles, and means associated with the magazine for prearranging the articles comprising a finger adapted to engage in the hole of these articles occupying a certain relative position and to rotate such articles in one direction through a predetermined angular distance but adapted to yield to permit passage of the other articles without imparting rotation thereto and a second finger adapted to rotate each article in the opposite direction through a corresponding predetermined angular distance.

8. In apparatus of the character described the combination of a drilling station, means providing a guideway leading to the drilling station and extending substantially at right angles to the drilling axis, a magazine extending substantially at right angles to said guideway and adapted to contain a plurality of hexagon shaped articles each having a previously formed hole therein, means for moving articles along said guideway from the magazine to the drilling station, and means associated with the magazine for prearranging the articles comprising a finger adapted to engage in the hole of the articles occupying a certain relative position and to rotate such articles in one direction through a predetermined angular distance but adapted to yield to permit passage of the other articles without imparting rotation thereto and a second finger adapted to rotate each article in the opposite direction through a corresponding predetermined angular distance.

LAWRENCE H. STRAYER.